UNITED STATES PATENT OFFICE.

OTTO K. ZWINGENBERGER, OF TOMPKINSVILLE, NEW YORK.

ART OF DETINNING TIN-SCRAP AND THE LIKE MATERIAL.

1,260,119. Specification of Letters Patent. Patented Mar. 19, 1918.

No Drawing. Application filed June 8, 1911, Serial No. 631,908. Renewed August 15, 1917. Serial No. 186,421.

*To all whom it may concern:*

Be it known that I, OTTO K. ZWINGENBERGER, a subject of the King of Saxony, residing at 3 Wiener Place, Tompkinsville, S. I., in the county of Richmond and State of New York, have made certain Invention in the Art of Detinning Tin-Scrap and the like Material, of which the following is a specification.

My invention relates to the art of detinning tin scrap and the like material by means of chlorin gas whereby the tin is taken off the sheet iron and the tin is transformed into tin-tetrachlorid. The object of my invention is to exclude the harmful influence of water which may come into contact with the raw material to be detinned, owing to the moisture in the chlorin gas or in the moisture in the atmosphere or whatever sources there may be.

In the detinning of tin scrap by means of chlorin gas the influence of water, which may be in the chlorin gas or may adhere in hardly noticeable traces to the tin scrap, is a source of great losses and troubles. If there is any water vapor in the detinning vessels the yield of tin-tetrachlorid is reduced in the degree water is present, for tin-tetrachlorid forms crystalline compounds with this water and these crystals cover then the inside walls of the detinning vessel as well as the tin scrap itself so that the whole mass looks just as if it were covered with fine snow. It is obvious that tin-tetrachlorid cannot be easily removed out of the reaction vessels when it has entered this crystalline form especially in view of the annoying properties of both the chlorin gas and liquid tin-tetrachlorid held by the fine crystals just like by a sponge, whereby great losses are sustained.

Further losses may occur for the fact that tin plate, covered with such fine crystals, is no more so easily accessible to chlorin gas so that the tin is but incompletely taken off the sheet iron, the resulting iron scrap being of less value.

Further losses may occur, as water, which accidentally is carried into the detinning vessels, is the cause for the formation of iron chlorid whereby great heat is generated which invites still greater formation of iron chlorid leading to great losses of chlorin gas. For all these losses the harmful influence of water in the detinning by means of chlorin gas has always been given much attention to reduce these losses as much as possible.

Many suggestions have been made in regard to this point. Suggestions to that point were mostly based on mechanical manipulations, for example to reduce the content of water in chlorin to the lowest possible minimum by liquefying the chlorin and then gasifying it again. Other suggestions are based on the absorption of water out of the chlorin gas by certain chemicals. Most of these suggestions are working with some success in other branches of the chemical industry, but for the detinning industry these methods are not reliable enough, for here even small traces of water, which would not be of any concern in the manufacture of many chemicals, are a great handicap in this art, causing much trouble and heavy losses.

All chemicals which absorb water, arrive after a certain period at the limit when they will be no more reliable in their action with regard to this point and it is especially at such critical moments when water in small quantities is easily carried into the detinning vessels. The tin scrap may be dried in heating chambers to be deprived of its adhering water, but it has been found out that, even notwithstanding careful drying, tin scrap may carry traces of water on account of atmospheric influences. Even after apparently successful efforts to exclude the water in the detinning process one very often finds after the operations that there has been some water present during the reaction which has escaped even the greatest care and attention.

All the methods to remove the water out of chlorin, referred to above, require a relatively big apparatus and expense, especially when it comes to avoid even the last traces of water in the process; all these apparatus require furthermore a steady control with painstaking tests as to be sure that water is excluded to play its harmful part during the process.

I have now discovered that this damage done by small quantities of water inside the detinning vessel can be eliminated by consuming the water by a chemical reaction.

Said reaction may be brought about by mixing with the chlorin gas another gaseous substance, such as sulfur-dioxid gas for instance, which, owing to the presence of the undesirable water will enter a reaction with the chlorin gas by which all the water is consumed and is thus removed, as there is seen from the following equation:

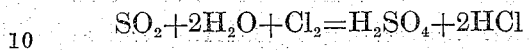

$$SO_2 + 2H_2O + Cl_2 = H_2SO_4 + 2HCl$$

these three bodies being transformed into sulfuric acid and hydrochloric acid.

This reaction, going on simultaneously with the detinning process, may therefore be called the secondary process, which has no disturbing influence on the detinning process itself nor on the commercial products generated in this process.

For carrying out the detinning by means of chlorin gas with an admixture of sulfur-dioxid gas one has for the first to find out by careful analytical tests and other controls how much water under careful observation of all conditions is likely to make its way into the detinning vessel and on the basis of the obtained figure one mixes with the chlorin gas so much sulfur-dioxid gas that at the end or at a short time before the end of the detinning operation the required quantity of sulfur-dioxid gas has been charged into the vessel with the chlorin gas needed for the detinning, suitably a small excess of sulfur-dioxid being applied to carry out this above mentioned secondary reaction to consume the water.

I may say here that it is of advantage to apply a small excess of sulfur-dioxid gas over the amount one has established by the analytical test and that in the average an excess of about five per cent. sulfur-dioxid gas has been found to be beneficial to the process. By this surplus of sulfur-dioxid gas especially good conditions seem to prevail resulting in an absolute removal of the water and increasing at the same time the yield of liquid tin-tetrachlorid as this heavy liquid has no more chance to take on the crystalline form and therefore cannot be held any more by a sponge-like obstruction but can easily be run off into the receptacles attached to the bottom of the vessels by means of a drainage pipe.

It is obvious that this method is not to be interpreted as an inducement to be less careful in the drying operations for both chlorin gas and tin scrap, as it is of course a necessity to make the best use of the expensive chlorin gas for the detinning process proper, but the invention offers safety against the great rise in temperature during the detinning process owing to the presence of water as well as against the losses of chlorin and tin by the complications resulting from iron burning up to iron chlorid for reasons given above. Both the chlorin and the sulfur dioxid gas may be admitted into the reaction vessel in any of the well known ways, either separate or mixed together. In order to get the chlorin gas and the sulfur-dioxid gas thoroughly mixed one preferably passes the two gases through a suitable apparatus like a mixing-chamber or tower before entering the detinning vessel. In the admixture of sulfur-dioxid gas to the chlorin gas one does well to pay attention to another point and to regulate the quantities of added sulfur-dioxid gas accordingly. This point lies in the fact that a considerable part of the water sits on the tin scrap and that it is therefore advisable to increase the sulfur-dioxid gas during the first few hours and to decrease it then to maintain it evenly in the further course of the operation.

The operation is carried out by simply conducting the two gases over the loosely bundled scrap, without applying any special pressure or underpressure.

The invention is not restricted to the use of sulfur-dioxid gas for the secondary reaction, nor is it to be considered to be an inert gas which might simply act as a mere diluent of the chlorin gas as occasionally applied in detinning scrap with dry chlorin gas in order to moderate the reaction, but it stands in the specification as a main representative of a class of gases or gaseous substances which in the presence of chlorin and water undergo a chemical process whereby the water is consumed; one of the resulting products of said process being hydrochloric acid whereas the other product or products will not embody chlorin. The advantages of the detinning process with chlorin and sulfur-dioxid gas or any other similarly working gas, consist in an easy control of the process as now the operation is going on more evenly because the temperature in the detinning vessel is better under control and many accidents are avoided, in a greater and more uniform yield of liquid tin tetrachlorid, in an easier and more complete removal of the surplus of chlorin gas, with the traces of sulfur-dioxid gas, and the remaining tin tetrachlorid at the end of the reaction by simply blowing out the vessel with compressed air, in the greater economy by avoiding unnecessary losses and in the freedom from all haphazards leading to losses and annoyances, especially when the gas is admitted at the top of the vessel and leaves at the bottom to enter another vessel at the top and so on. The main source of trouble, viz. the water, being automatically removed in a chemical way the process may be most conveniently carried out on a large scale simultaneously in a plurality of vessels by any of the well known ways used in the chemical industry when gases act on solid bodies in big reaction vessels.

What I claim as my invention and desire to secure by Letters Patent of the United States is:

1. The process of detinning tin scrap and the like material, consisting in protecting the raw material during the action of chlorin on same from the influence of moisture by decomposing said moisture by a chemical reaction.

2. The process of detinning tin scrap and the like material, consisting in treating tin scrap with chlorin gas in the presence of moisture and eliminating the influence of said moisture by decomposing it by chemical reaction between another gas, chlorin and water.

3. The process of detinning tin scrap and the like material, consisting in treating tin scrap with chlorin gas in the presence of moisture and consuming said moisture by a chemical reaction furnishing hydrochlorid acid and another product not embodying chlorin.

4. The process of detinning tin scrap and the like material consisting in treating tin scrap in the presence of moisture with a mixture of chlorin gas, admitting an excessive quantity of another gaseous substance and decomposing the moisture by its action with the chlorin and the other gaseous substance.

5. The process of detinning tin scrap or the like material, which consists in treating tin scrap with a mixture of both chlorin and sulfur dioxid gas.

6. The process of detinning tin scrap and the like material, consisting in treating tin scrap in the presence of moisture with a mixture of chlorin and sulfurdioxid gas.

7. The process of detinning tin scrap and the like material, consisting in treating tin scrap in the presence of moisture with a mixture of chlorin and of sulfur dioxid gas, the latter gas being in excess of the quantity necessary for consuming the water by a chemical reaction between the water and the constituents of the gas mixture.

8. The process of detinning tin scrap and the like material, consisting in treating tin scrap in the presence of moisture with a mixture of chlorin and sulfur dioxid gas, thoroughly mixed before being admitted the reaction material, and consuming the water by a chemical reaction between the water and the constituents of the gas mixture.

In testimony whereof I have signed my name to this specification in the presence of two subscribing witnesses.

OTTO K. ZWINGENBERGER.

Witnesses:
RAE LIVINGSTON EGBERT,
WALTER E. HEAP.

Copies of this patent may be obtained for five cents each, by addressing the "Commissioner of Patents, Washington, D. C."